United States Patent
Abe et al.

(10) Patent No.: US 8,601,801 B2
(45) Date of Patent: Dec. 10, 2013

(54) EXHAUST ASSEMBLY FOR CONSTRUCTION MACHINE

(75) Inventors: Toshihiro Abe, Tsuchiura (JP); Shouhei Kamiya, Tsuchiura (JP); Hideki Onuma, Tsuchiura (JP); Hiroyuki Kamata, Tsuchiura (JP); Hiroki Sugawara, Tsuchiura (JP); Hirotaka Kawamukai, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 147 days.

(21) Appl. No.: 13/248,400

(22) Filed: Sep. 29, 2011

(65) Prior Publication Data

US 2012/0079810 A1   Apr. 5, 2012

(30) Foreign Application Priority Data

Sep. 30, 2010   (JP) ................ 2010-221446

(51) Int. Cl.
*F01N 3/02*   (2006.01)

(52) U.S. Cl.
USPC .............................. 60/311; 60/272

(58) Field of Classification Search
USPC .......................................................... 60/311
See application file for complete search history.

(56) References Cited

U.S. PATENT DOCUMENTS

| | | | | |
|---|---|---|---|---|
| 7,424,931 B2* | 9/2008 | Smith | .......................... | 181/256 |
| 2003/0118762 A1* | 6/2003 | Brown et al. | ............... | 428/36.1 |

FOREIGN PATENT DOCUMENTS

| | | | |
|---|---|---|---|
| JP | 55-176429 | | 6/1954 |
| JP | 11-257045 | | 9/1999 |
| JP | 11257045 A | * | 9/1999 |
| JP | 2002-161742 | | 6/2002 |
| JP | 2002161742 A | * | 6/2002 |
| JP | 2005-282533 A | | 10/2005 |
| JP | 2008-202543 | | 9/2008 |
| JP | 2008-261242 A | | 10/2008 |
| JP | 2010-043572 | | 2/2010 |
| JP | 2010043572 A | * | 2/2010 |
| JP | 2010-169301 | | 8/2010 |

OTHER PUBLICATIONS

English translation of JP2002161742A.*
English translation of JP11257045A.*
Japanese Office Action dated Jan. 29, 2013 (2 pages).

* cited by examiner

*Primary Examiner* — Thomas Denion
*Assistant Examiner* — Jason Shanske
(74) *Attorney, Agent, or Firm* — Crowell & Moring LLP

(57) ABSTRACT

Disclosed is an exhaust assembly for a construction machine having a revolving upperstructure and an engine mounted on the revolving upperstructure. The exhaust assembly is to be arranged inside the revolving upperstructure of the construction machine, and is provided with an after-treatment device for exhaust gas from the engine and an exhaust pipe for releasing exhaust gas, which has been guided from an outlet port of the after-treatment device, to an outside. The exhaust assembly includes a concave-convex part, which has plural concavities and convexities, is arranged on an inner wall of the exhaust pipe, and extends in a direction of discharge of the exhaust gas.

5 Claims, 8 Drawing Sheets

EXHAUST ASSEMBLY FOR CONSTRUCTION MACHINE

CROSS-REFERENCE TO RELATED APPLICATION

This application claims the priority of Japanese Patent Application 2010-221446 filed Sep. 30, 2010, which is incorporated herein by reference.

BACKGROUND OF THE INVENTION

1. Field of the Invention

The present invention relates to an exhaust assembly for a construction machine, which is provided with an exhaust pipe for releasing engine exhaust gas, which has been discharged from an after-treatment device for the engine exhaust gas, to the outside.

2. Description of the Related Art

In general, a construction machine such as a hydraulic excavator is provided with a travel base having crawler tacks or the like to travel, a revolving upperstructure connected to an upper part of the travel base via a revolving frame and swingable in a horizontal direction, and a front working mechanism arranged on a front section of the revolving upperstructure and having actuators to perform work such as digging.

The revolving upperstructure of the construction machine is in turn provided with an engine accommodated inside an engine compartment, an after-treatment device for treating exhaust gas from the engine, and an exhaust pipe for releasing the exhaust gas, which has been guided from an outlet port of the after-treatment device, to the outside.

As one of conventional technologies on after-treatment devices arranged in such construction machines, an after-treatment device for use in a diesel engine is known. This after-treatment device is provided with an exhaust choke valve arranged on a downstream side, and is adapted to increase the temperature of exhaust gas such that catalytic activity is assured, and is intended to reduce noise which is produced upon opening of the exhaust choke valve (see, for example, JP-A-2005-282533).

In the above-mentioned exhaust gas after-treatment device for the diesel engine as disclosed in JP-A-2005-282533, an oxidation catalyst is employed as a catalyst for removing particulate matter such as hydrocarbons. As a result of an oxidative reaction of the particulate matter on the oxidation catalyst, water vapor is produced. In an exhaust assembly for a construction machine, said exhaust assembly being provided with such an after-treatment device, water vapor is discharged into an exhaust pipe together with exhaust gas guided from the after-treatment device. When the temperature of the exhaust pipe is low, the water vapor is cooled in the exhaust pipe so that water droplets condense and adhere on an inner wall of the exhaust pipe. The condensation and adhesion of water droplets on the inner wall of the exhaust pipe becomes pronounced especially at the time of initiation of work by the construction machine, because the exhaust pipe has not been warmed up yet at that time.

Even when the above-mentioned after-treatment device is provided, soot and the like contained in exhaust gas cannot be treated completely. Soot and the like, therefore, adhere to the inner wall of the exhaust pipe when the exhaust gas guided from the after-treatment device is released to the outside. As a consequence, soot and the like accumulate on the inner wall of the exhaust pipe so that water droplets condensed and adhered on the inner wall of the exhaust pipe contain lots of soot and the like and have been blackened.

Accordingly, a conventional exhaust assembly for a construction machine, said conventional exhaust assembly being provided with such an after-treatment device, involves a problem in that water droplets condensed and adhered on an inner wall of an exhaust pipe and blackened there are forced out by exhaust gas guided from an outlet port of the after-treatment device, accumulate at an outlet of the exhaust pipe, scatter to the outside of the exhaust pipe, and hence, foul a body cover of a revolving upperstructure.

As one of conventional technologies for preventing the above-described problem, a muffler assembly has been proposed for a vehicle. This muffler assembly for the vehicle is provided on an inner wall of an exhaust pipe with a water-droplets capturing member. This water-droplets capturing member has a water-droplets intercepting ring inwardly extending in an annular form from the exhaust pipe and a ring-shaped flange extending in an annular form from an inner circumferential edge of the water-droplets intercepting ring toward a basal end of the exhaust pipe (see, for example, JP-A-2008-261242).

In the muffler assembly disclosed in JP-A-2008-261242, however, the water-droplets intercepting ring and ring-shaped flange of the water-droplets intercepting member extend inwardly and substantially in the annular forms at the outlet of the exhaust pipe as mentioned above. The opening area at the outlet of the exhaust pipe is, therefore, smaller than the cross-section of a passage for exhaust gas that flows through the exhaust pipe. Accordingly, the emission of the exhaust gas is interfered by the water-droplets intercepting ring and ring-shaped flange, the exhaust gas stagnates at the outlet of the exhaust pipe, and the exhaust resistance in the exhaust pipe increases. As a result, the acceleration performance of the engine and the fuel economy may be adversely affected. As water droplets are captured only at the outlet of the exhaust pipe, there is also a possibility that some of water droplets may be discharged to the outside.

SUMMARY OF THE INVENTION

With the foregoing circumstances in view, the present invention has as an object thereof the provision of an exhaust assembly for a construction machine, which can substantially prevent water droplets, which have condensed and adhered on an inner wall of an exhaust pipe and contain soot and the like, from scattering to the outside of the exhaust pipe and can avoid any substantial increase in exhaust resistance without enlargement of the assembly.

To achieve the above-described object, the present invention provides, in one aspect thereof, an exhaust assembly for a construction machine having a revolving upperstructure and an engine mounted on the revolving upperstructure, said exhaust assembly being to be arranged inside the revolving upperstructure of the construction machine and being provided with an after-treatment device for exhaust gas from the engine and an exhaust pipe for releasing exhaust gas, which has been guided from an outlet port of the after-treatment device, to an outside, comprising a concave-convex part having plural concavities and convexities, arranged on an inner wall of the exhaust pipe, and extending in a direction of release of the exhaust gas.

According to the present invention constructed as described above, even when water vapor discharged from the after-treatment device into the exhaust pipe is cooled in the exhaust pipe to condense and adhere as water droplets on the inner wall of the exhaust pipe, the condensed and adhered water droplets are captured by the concavities and convexities of the concave-convex part arranged on the inner wall of the exhaust pipe. Therefore, the water droplets are retained in concavities at the concave-convex part, thereby making it possible to substantially prevent water droplets, which contain soot and the like, from being forced out by exhaust gas guided from the outlet port of the after-treatment device. As a consequence, the water droplets, which have condensed and adhered on the inner wall of the exhaust pipe and contain soot and the like, can be substantially prevented from accumulating at the outlet of the exhaust pipe and scattering to the outside of the exhaust pipe.

Especially at the time of initiation of work by the construction machine, a substantial fraction of water vapor discharged from the after-treatment device into the exhaust pipe tends to be cooled in the exhaust pipe and to condense and adhere as water droplets on the inner wall of the exhaust pipe. The exhaust pipe is warmed up with exhaust gas guided from the after-treatment device while the condensed and adhered water droplets are kept captured at the concave-convex part arranged on the inner wall of the exhaust pipe, and the water droplets are caused to evaporate again with the heat of the exhaust pipe. The water droplets, which contain soot and the like, can remain inside the exhaust pipe, and can be substantially prevented from scattering to the outside of the exhaust pipe. As the present invention requires simply to arrange the concave-convex part, which have the plural concavities and convexities, on the inner wall of the exhaust pipe such that it extends in the direction of release of the exhaust gas. The concave-convex part of the exhaust pipe, therefore, does not interfere with the release of exhaust gas at the outlet of the exhaust pipe when the exhaust gas flowed through the exhaust gas is released to the outside of the revolving upperstructure. It is, therefore, possible to avoid any substantial increase in exhaust resistance without needing enlargement of the opening at the outlet of the exhaust pipe. As described above, the present invention can substantially prevent water droplets, which have condensed and adhered on the inner wall of the exhaust pipe and contain soot and the like, from scattering to the outside of the exhaust pipe, and can also avoid any substantial increase in exhaust resistance without needing enlargement of the assembly.

In the exhaust assembly according to the present invention, the concavities and convexities may preferably extend in a direction transverse to a direction of a flow of exhaust gas. When water vapor discharged from the after-treatment device into the exhaust pipe is cooled in the exhaust pipe to condense and adhere as water droplets on the inner wall of the exhaust pipe and the condensed and adhered water droplets are forced out by exhaust gas along the inner wall of the exhaust pipe, the water droplets are readily subjected to resistance from the concavities and convexities of the concave-convex part when the concavities and convexities are constructed as described above. This construction can provide the concave-convex part, which is arranged on the inner wall of the exhaust pipe, with improved capturing performance for water droplets. It is, therefore, possible to substantially prevent water droplets, which have condensed and adhered on the inner wall of the exhaust pipe and contain soot and the like, from accumulating at the outlet of the exhaust pipe and scattering to the outside of the exhaust pipe.

In the exhaust assembly according to the present invention as described immediately above, the concave-convex part may preferably have a mesh structure, which may be, for example, a wire netting. When constructed so, the mesh structure as the concave-convex part can be readily arranged on the inner wall of the exhaust pipe so that the manufacturing cost can be reduced. Further, the formation of the concave-convex part from the mesh structure does not impair the flowability of exhaust gas in the exhaust pipe. It is, therefore, possible to minimize an increase in back pressure, which would occur by the arrangement of such a concave-convex part on the inner wall of the exhaust pipe.

In the exhaust assembly according to the present invention, the exhaust pipe may preferably be arranged to enclose a circumferential edge portion of the outlet port of the after-treatment device such that an air hole is defined between the exhaust pipe and the circumferential edge portion of the outlet port of the after-treatment device to allow ambient air to flow into the exhaust pipe through the air hole. When constructed so, the temperature of exhaust gas to be released from the exhaust pipe to the outside can be lowered, thereby making it possible to reduce an adverse effect of exhaust gas on the surrounding.

The exhaust assembly according to the present invention is to be arranged inside the revolving upperstructure of the construction machine, and is provided with the after-treatment device for exhaust gas from the engine and the exhaust pipe for releasing exhaust gas, which has been treated by the after-treatment device and guided from the outlet port of the after-treatment device, to the outside. On the inner wall of the exhaust pipe, the concave-convex part having the plural concavities and convexities is arranged extending in the direction of release of the exhaust gas. Water droplets occurred as a result of cooling of water vapor, which has been discharged together with exhaust gas into the exhaust pipe, in the exhaust pipe are captured by the concavities and convexities of the concave-convex part arranged on the inner wall of the exhaust pipe. It is, therefore, possible to substantially prevent water droplets, which contain soot and the like, from being forced out with exhaust gas guided from the outlet port of the after-treatment device. Especially at the time of initiation of work by the construction machine, the exhaust pipe is warmed up while water droplets are kept captured by the concavities and convexities, and these water droplets are caused to evaporate again with heat of the exhaust pipe. It is, accordingly, possible to effectively and substantially prevent water droplets from being forced out with exhaust gas. As a consequence, water droplets, which have condensed and adhered on the inner wall of the exhaust pipe and contain soot and the like, can be substantially prevented from accumulating at the outlet of the exhaust pipe and scattering to the outside of the exhaust pipe. Even after the initiation of work, the revolving upper structure can hence retain its clean appearance without being fouled. Moreover, the concave-convex part of the exhaust pipe does not interfere at the outlet of the exhaust pipe with the release of exhaust gas guided from the after-treatment device into the exhaust pipe upon release of the exhaust gas to the outside of the revolving upperstructure. It is, therefore, possible to avoid any substantial increase in exhaust resistance without needing enlargement of the assembly.

DETAILED DESCRIPTION OF PREFERRED EMBODIMENTS

With reference to the accompanying drawings, a description will hereinafter be made of the embodiments for carrying out the exhaust assembly according to the present invention for the construction machine.

First Embodiment

Figure 1:
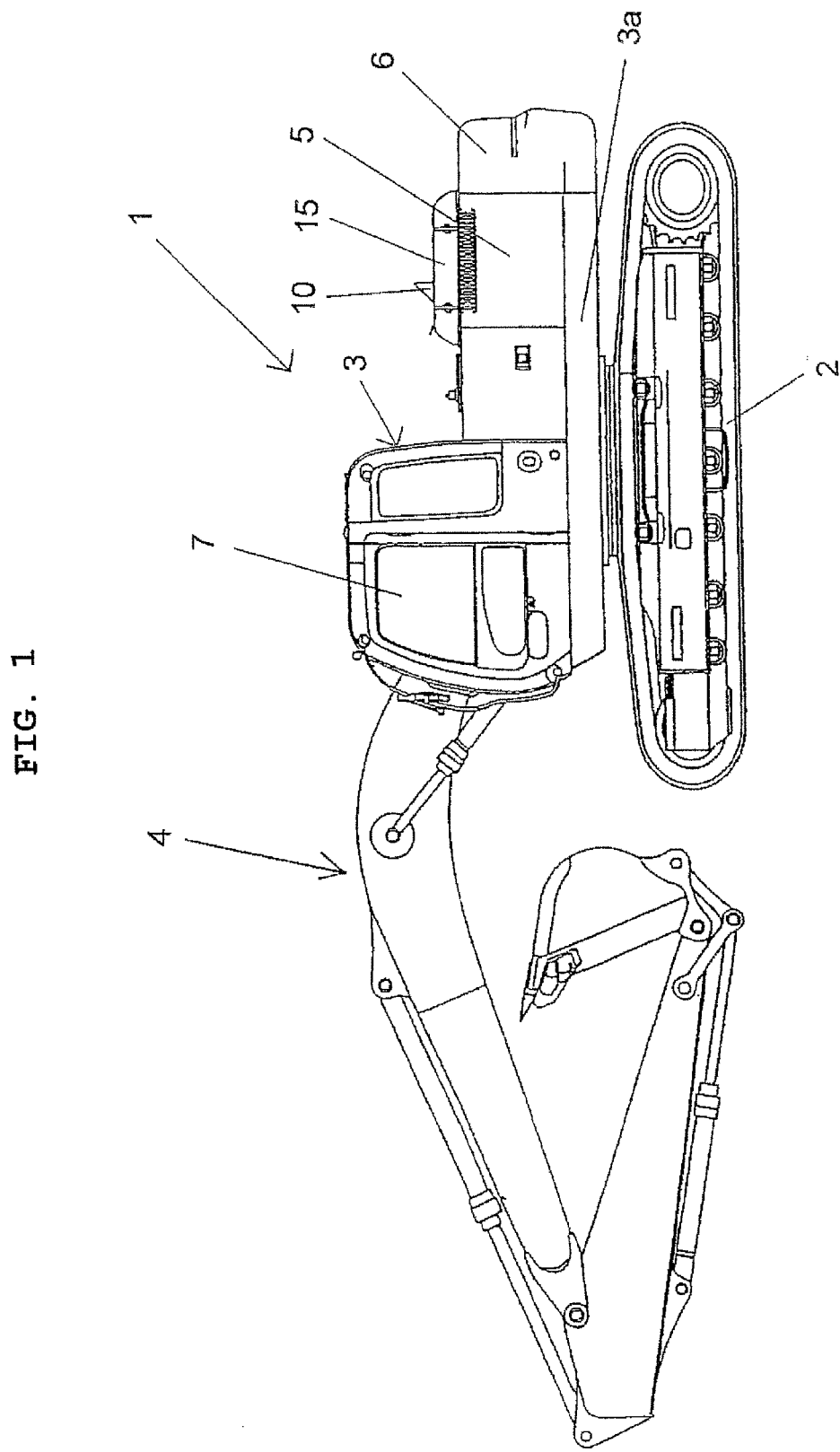
FIG. 1 is a side view of a hydraulic excavator mentioned as one example of a construction machine to which a first embodiment of the exhaust assembly according to the present invention for the construction machine can be applied.

The first embodiment of the present invention for the construction machine is arranged, for example, on a hydraulic excavator as illustrated in FIG. 1. This hydraulic excavator 1 is provided with a travel base 2, a revolving upperstructure 3 arranged on an upper side of the travel base 2 and having a revolving frame 3a, and a front working mechanism 4 attached to a front part of the revolving upperstructure 3 and pivotal in an up-and-down direction. The revolving upperstructure 3 is in turn provided with an operator's cab 7 located at the front part of the revolving upperstructure 3, a counterweight 6 arranged at a rear part of the revolving upperstructure 3, and an engine compartment 5 disposed between the operator's cab 7 and the counterweight 6.

Figure 2:
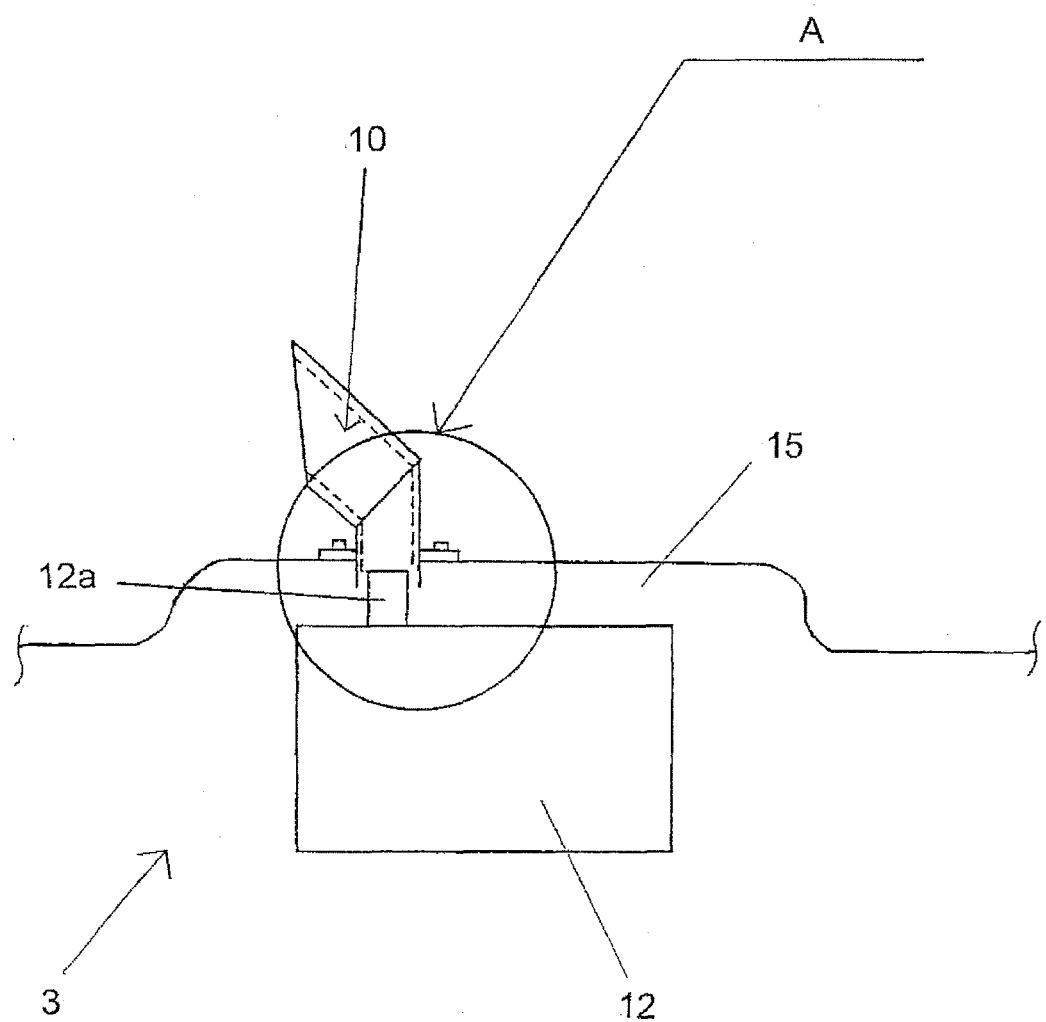
FIG. 2 is a fragmentary schematic view illustrating the construction of the first embodiment of the present invention.

As illustrated in FIG. 2, the first embodiment of the present invention is provided with a body cover 15, an after-treatment device 12 and an exhaust pipe 10. The body cover 15 covers an upper part of the engine compartment 5. The after-treatment device 12 treats exhaust gas from an engine which is arranged inside and is not illustrated. The exhaust pipe 10 releases, to the outside, the exhaust gas treated in the after-treatment device 12 and guided from an outlet port 12a of the after-treatment device 12.

Figure 3:
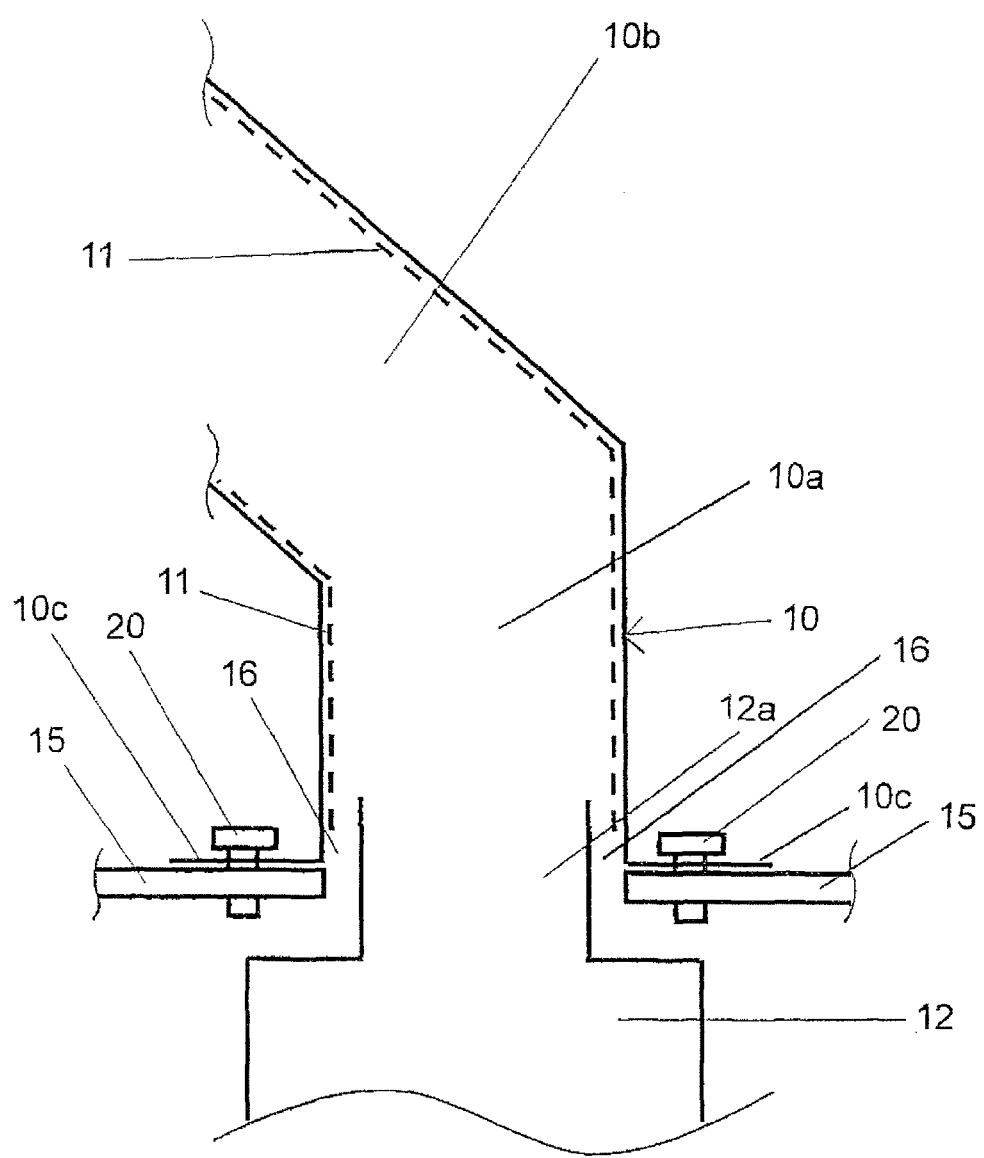
FIG. 3 is an enlarged view of a part A shown in FIG. 2.

As depicted in FIG. 3, the exhaust pipe 10 has a vertical section 10a arranged vertically, a bent portion 10b bent out from the vertical section 10a, and a mounted part 10c through which bolts 20 to be described subsequently herein are arranged. In the first embodiment of the present invention, a concave-convex part having plural concavities and convexities is arranged on the inner wall of the exhaust pipe 10 such that the concave-convex part extends in the direction of release of exhaust gas. The concavities and convexities extend in a direction transverse to the direction of a flow of exhaust gas guided from the outlet port 12a of the after-treatment device 12. This concave-convex part has, for example, a mesh structure. In the first embodiment of the present invention, this mesh structure is formed of a wire netting 11 fixed by welding on the entire inner wall of the exhaust pipe 10, namely, on the inner walls of the vertical section 10a and bent section 10b.

Further, the exhaust pipe 10 is arranged to enclose a circumferential edge portion of the outlet port 12a of the after-treatment device 12, and air holes 16 are defined between the vertical section 10a of the exhaust pipe 10 and the outlet port 12a of the after-treatment device 12 to allow ambient air to enter into the exhaust pipe 10 from between the vertical section 10a of the exhaust pipe 10 and the outlet port 12a of the after-treatment device 12. In the first embodiment of the present invention, the above-mentioned mounted part 10c of the exhaust pipe 10 is secured by the bolts 20 on the body cover 15 of the revolving upperstructure 3

According to the first embodiment of the present invention constructed as described above, even when water vapor discharged from the after-treatment device 12 into the exhaust pipe 10 is cooled by the exhaust pipe 10 to condense and adhere as water droplets on the inner walls of the exhaust pipe 10, the water droplets condensed and adhered on the inner wall of the exhaust pipe 10 are kept captured by the wire netting 11 fixed on the entire inner wall of the vertical section 10a and bent section 10b of the exhaust pipe 10, in other words, the water droplets remain in the mesh structure of the wire netting 11. Therefore, the water droplets with soot and the like contained therein can be substantially prevented from being forced out by exhaust gas guided from the outlet port 12a of the after-treatment device 12. As a consequence, the water droplets, which have condensed and adhered on the inner wall of the exhaust pipe 10 and contain soot and the like, can be substantially prevented from accumulating at the outlet of the exhaust pipe 10 and scattering to the outside of the exhaust pipe 10.

When water vapor discharged from the after-treatment device 12 into the exhaust pipe 10 especially at the time of initiation of work by the hydraulic excavator 11 is cooled in the exhaust pipe 10 to condense and adhere as water droplets on the inner wall of the exhaust pipe 10, the exhaust pipe 10 is warmed up with exhaust gas guided from the after-treatment device 12 while the water droplets are kept captured by the wire netting 11, and hence, primarily the water in the water droplets evaporates with the heat of the exhaust pipe 10, thereby making it possible to substantially preventing water droplets, which contain soot and the like, from accumulating at the outlet of the exhaust pipe 10 and scattering to the outside of the exhaust pipe 10. As a consequence, it is possible to substantially prevent water droplets, which have condensed and adhered on the inner wall of the exhaust pipe 10, contain soot and the like and have been blackened, from scattering to the outside of the exhaust pipe 10 and fouling the body cover 15 and equipment arranged in the vicinity of the exhaust pipe 10. The clean appearance of the revolving upperstructure 3 can, therefore, be maintained even after initiation of work.

In the first embodiment of the present invention, the concave-convex part arranged on the inner wall of the exhaust pipe 10 to capture water droplets has a mesh structure, and this mesh structure is formed of the wire netting 11 fixed on the entire inner walls of the vertical section 10a and bent section 10b of the exhaust pipe 10. It is, therefore, only necessary to arrange the wire netting 11, which can be manufactured at low cost, on and along the inner walls of the vertical section 10a and bent section 10b of the exhaust pipe 10. The manufacturing cost of the exhaust assembly can be minimized, and the exhaust assembly is excellent in economy. The wire netting 11 as the mesh structure is fixed extending along the inner wall of the exhaust pipe 10, and moreover, is in the form of a network with numerous openings defined therein. Therefore, the wire netting 11 does not impair the flowability of exhaust gas in the exhaust pipe 10, and no substantial increase occurs in exhaust resistance. As has been described above, the first embodiment of the present invention can substantially prevent water droplets, which have condensed and adhered on the inner wall of the exhaust pipe 10 and contain soot and the like, from scattering to the outside of the exhaust pipe 10. In addition, the wire netting 11 does not interfere with the release of exhaust gas at the outlet of the exhaust pipe 10, thereby making it possible to avoid any substantial increase in exhaust resistance without needing enlargement of the assembly. It is to be noted that, even if the wire netting 11 is filled with soot or the like, the wire netting 11 can be readily replaced with a new wire netting by using bolts or the like, which can be removed from the exhaust pipe 10, instead of welding to fix the wire netting 11 on the exhaust pipe 10.

In the first embodiment of the present invention, the wire netting 11 has concavities and convexities, which extend in a direction transverse to the direction of a flow of exhaust gas. When water vapor discharged from the after-treatment device 12 into the exhaust pipe 10 is cooled in the exhaust pipe 10 to condense and adhere as water droplets on the inner wall of the exhaust pipe 10 and the condensed and adhered water droplets are forced out by exhaust gas along the inner wall of the exhaust pipe 10, the water droplets are readily subjected to resistance from the concavities and convexities of the wire netting 11 arranged on the inner wall of the exhaust pipe 10. As a consequence, the concave-convex part arranged on the inner wall of the exhaust pipe 10 can be provided with improved capturing performance for water droplets, and can substantially prevent water droplets, which have condensed and adhered on the inner wall of the exhaust pipe 10 and contain soot and the like, from accumulating at the outlet of the exhaust pipe 10 and scattering to the outside of the exhaust pipe 10.

In the first embodiment of the present invention, the exhaust pipe 10 the inner diameter which is greater than the outer diameter of the exhaust port 12a of the after-treatment device 12 is arranged such that the exhaust pipe 10 encloses the circumferential edge portion of the outlet port 12a of the after-treatment device 12. Therefore, the air holes 16 are formed between the vertical section 10a of the exhaust pipe 10 and the circumferential edge portion of the outlet port 12a of the after-treatment device 12. By exhaust gas guided from the after-treatment device 12, the air inside the engine compartment 5 is drawn from the air holes 16 into the exhaust pipe 10 owing to the ejector effect and is mixed with the exhaust gas of high temperature. As a result, the temperature of the exhaust gas can be lowered, thereby making it possible to reduce an effect of heat on the surrounding.

In the first embodiment of the present invention, the mounted part 10c of the exhaust pipe 10 is secured on the body cover 15 of the revolving upperstructure 3 via the bolts 20. Therefore, the exhaust pipe 10 is fixedly supported on the body cover 15 having rigidity, thereby making it possible to realize a stable structure without being affected by vibrations and the like during work.

Second Embodiment

Figure 4:
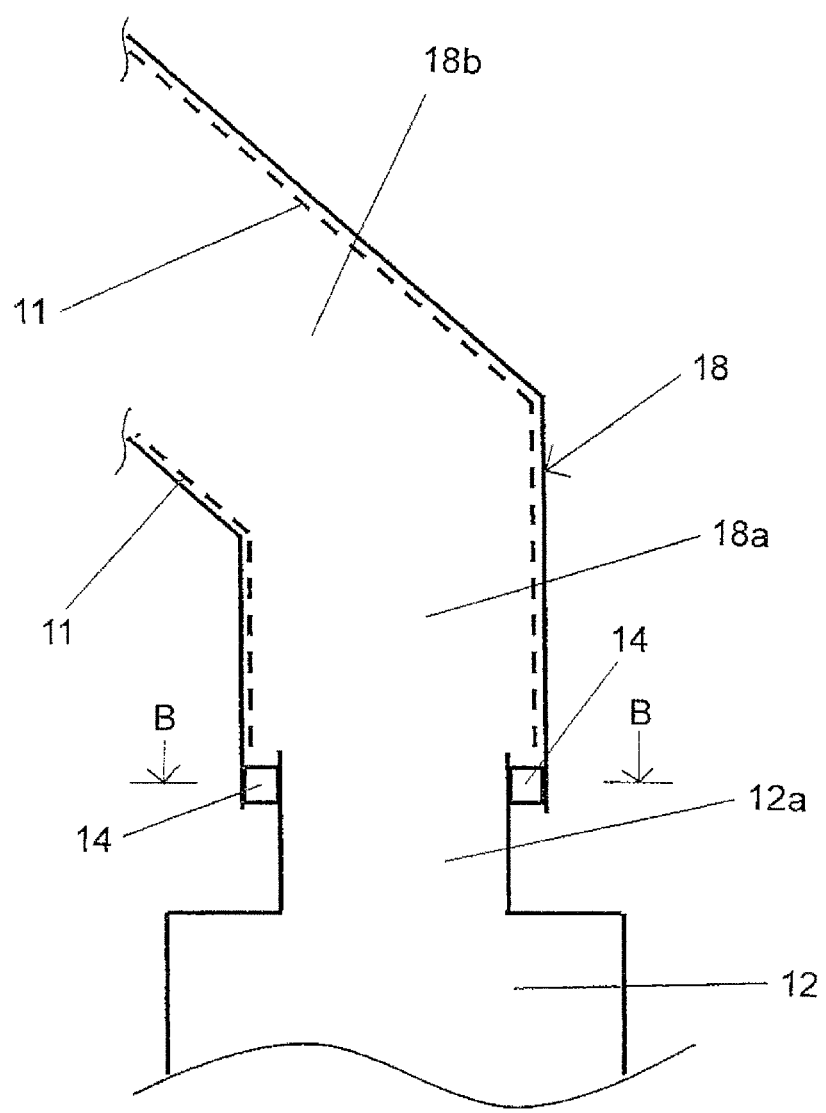
FIG. 4 is an enlarged fragmentary schematic view corresponding to FIG. 3, and illustrates a second embodiment of the present invention.
Figure 5:
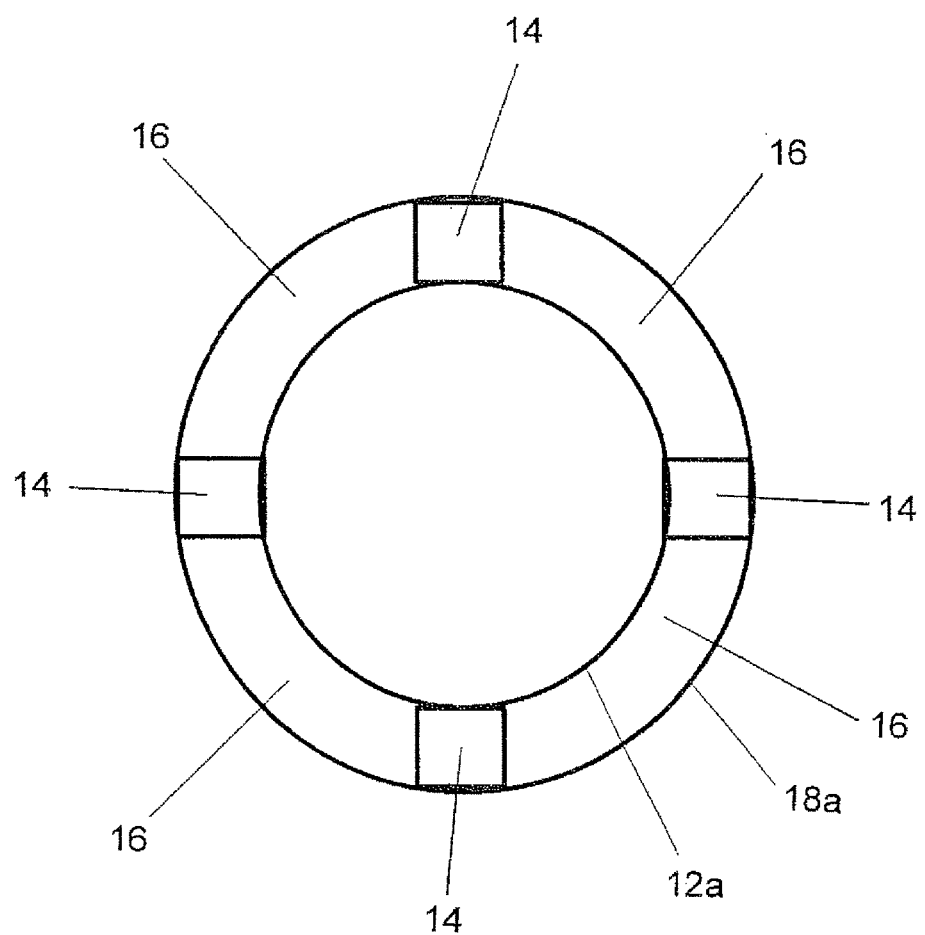
FIG. 5 is a cross-sectional view taken along line V-V of FIG. 4.

Referring next to FIGS. 4 and 5, the second embodiment of the present invention will be described.

As depicted in FIGS. 4 and 5, the second embodiment of the present invention is different from the above-described first embodiment in that, while the first embodiment has the construction that the exhaust pipe 10 has the mounted part 10c and this mounted part 10c is fixed on the body cover 15 of the revolving upperstructure 3 via the bolts 20, the second embodiment has a construction that an exhaust pipe does not have any part corresponding to the mounted part 10c and a vertical section 18a of the exhaust pipe 18 is directly secured, for example, by welding on the outlet port 12a of the after-treatment device 12 via fixing members 14. The remaining construction of the second embodiment is the same as that of the first embodiment, including that the exhaust pipe 18 also has a bent section 18b and the wire netting 11 is fixed by welding on the entire inner walls of the vertical section 18a and vent section 18b.

According to the second embodiment constructed as described above, the inner diameter of the vertical section 18a of the exhaust pipe 18 is set greater than the outer diameter of the outlet port 12a of the after-treatment device 12, and the exhaust pipe 18 is secured via the fixing members 14 by arranging the vertical section 18a of exhaust pipe 18 to enclose the circumferential edge portion of the outlet port 12a of the after-treatment device 12. Therefore, the air holes 16 can be readily arranged between the vertical section 18a of the exhaust pipe 18 and the circumferential edge portion of the outlet port 12a of the after-treatment device 12. Further, the exhaust pipe 18 can be easily secured by welding or the like on the circumferential edge portion of the outlet port 12a of the after-treatment device 12 via the fixing members 14, thereby making it possible to reduce the load on a worker in the installation work of the exhaust pipe 18. Furthermore, the exhaust pipe 18 and the after-treatment device 12 are constructed as an integral unit via the fixing members 14, thereby making it possible to assure the release of exhaust gas, which has been guided from the after-treatment device 12, to the outside of the exhaust pipe 18.

Third Embodiment

Figure 6:
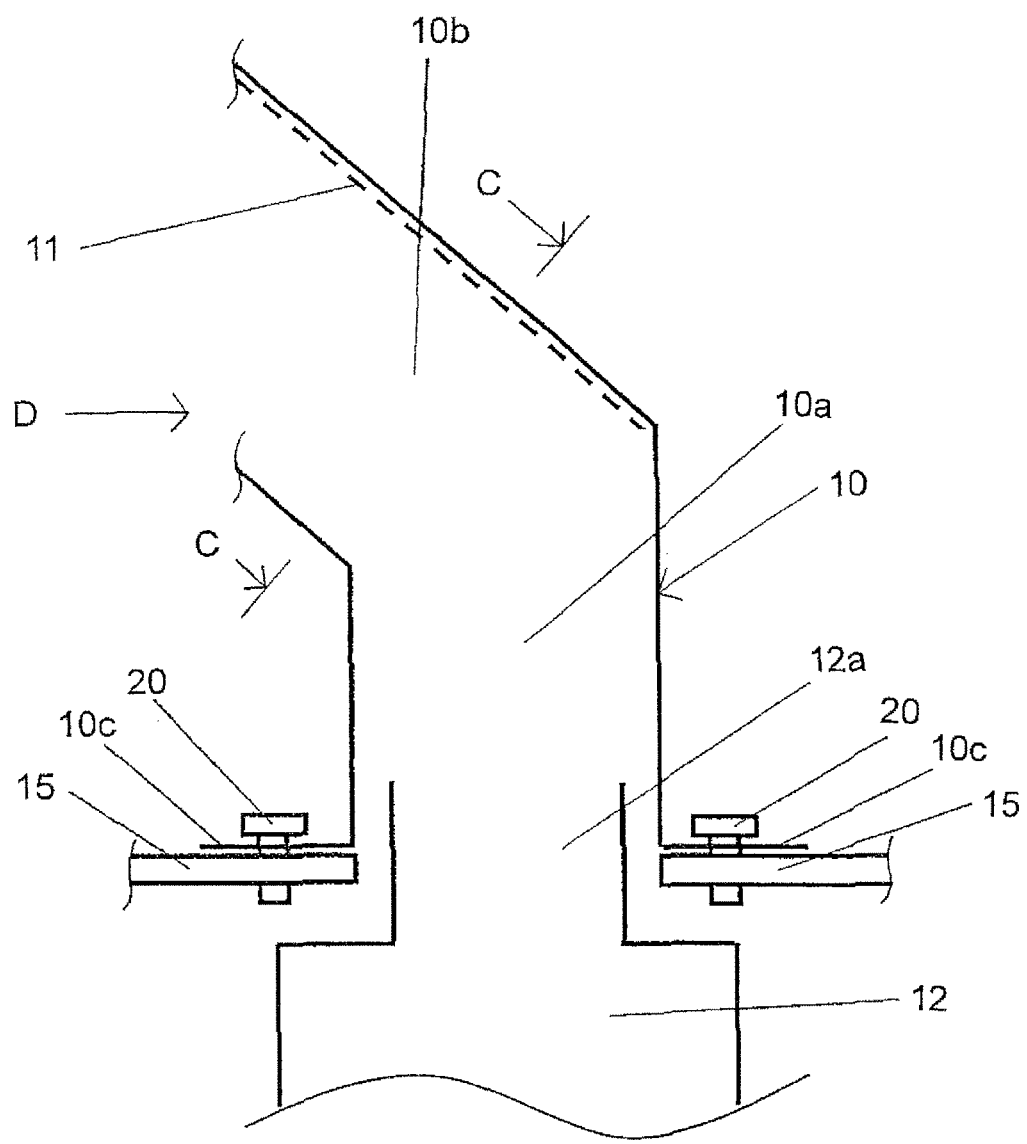
FIG. 6 is an enlarged fragmentary schematic view corresponding to FIGS. 3 and 4, and illustrates a third embodiment of the present invention.
Figure 7:
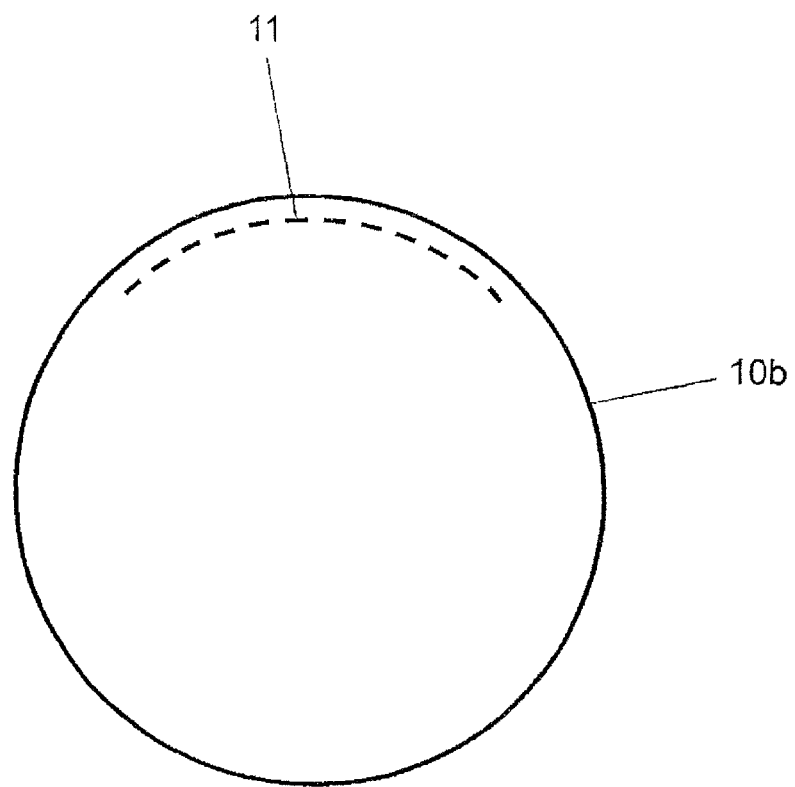
FIG. 7 is a schematic cross-sectional view taken along line VII-VII of FIG. 4.
Figure 8:
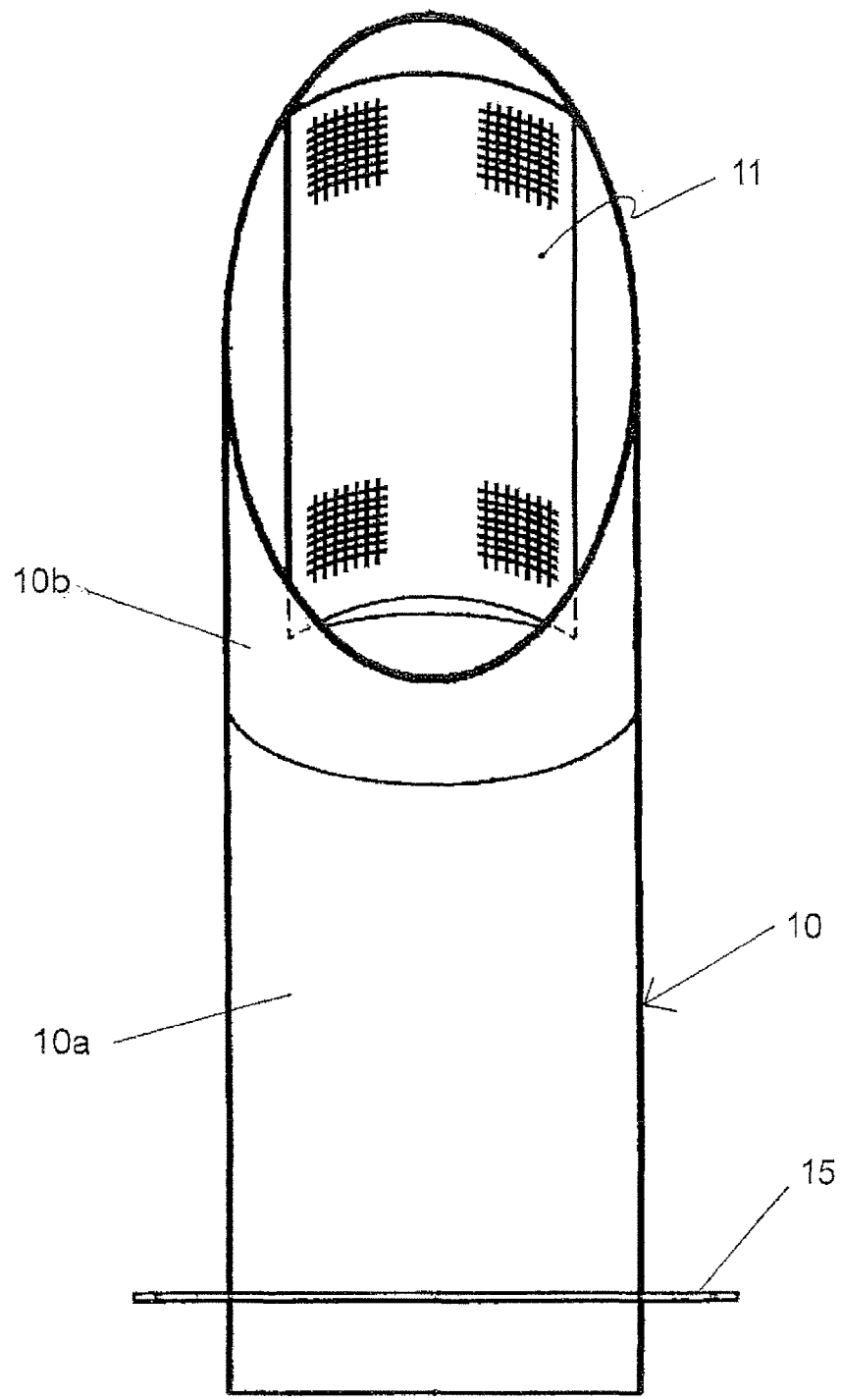
FIG. 8 is a rearview illustrating an installation position of a wire netting on an inner wall of the exhaust pipe of FIG. 6, as observed in the direction of arrow D shown in FIG. 6

Referring next to FIGS. 6 through 8, the third embodiment of the present invention will be described.

As depicted in FIGS. 6 and 7, the third embodiment of the present invention is different from the above-described first embodiment in that, while the first embodiment has the construction that the wire netting 11 is arranged as a mesh structure on the entire inner walls of the vertical section 10a and bent section 10b of the exhaust pipe 10, the third embodiment has a construction that as a concave-convex part, a wire netting 11 in the form of a mesh structure is not arranged on the entire inner wall of the exhaust pipe 10 but is arranged on an upper part of the inner wall of the bent section 10b of the exhaust pipe 10. Described specifically, as depicted in FIG. 8, the wire netting 11 in the third embodiment of the present invention is not arranged on the inner wall of the vertical section 10a of the exhaust pipe 10, but is arranged on the upper part of the inner wall of the bent section 10b of the exhaust pipe 10 over a quarter of a circle. The remaining construction of the third embodiment is the same as that of the first embodiment.

According to the third embodiment of the present invention constructed as described above, the wire netting 11 of the mesh structure is arranged at a location where water droplets are known through experience to most easily condense and adhere as a result of cooling of water vapor, which has been guided together with exhaust gas from the outlet port 12a of the after-treatment device 12, in the exhaust pipe 10, specifically on the upper part of the inner wall of the bent section 10b of the exhaust pipe 10 over a quarter of a circle as depicted in FIG. 8. The wire netting 11 can, therefore, effectively capture a large majority of water droplets, which have condensed and adhered on the inner wall of the exhaust pipe 10, without needing to arrange a wire netting on the entire inner wall of the exhaust pipe 10. As it is unnecessary to arrange a wire netting on the entire inner walls of the vertical section 10a and bent section 10b of the exhaust pipe 10, the fixing work of the wire netting 11 can be readily conducted. As a consequence, the manufacturing cost of the exhaust pipe 10 having the wire netting 11 as a mesh structure can be reduced, thereby making it possible to provide improved economy.

In each of the above-described the first to third embodiments of the present invention, the description was made about the arrangement of the wire netting 11 of a mesh structure as a concave-convex part on the inner wall of the exhaust pipe 10. The concave-convex part is not limited to such a wire netting. Using a worked metal plate with plural through-holes formed therein by subjecting a metal plate to punching work on a turret punch press or the like, this worked metal plate may be fixed by welding or the like on the inner wall of the exhaust pipe 10 as a mesh structure in place of the metal netting 11. In this case, the worked metal plate can be readily manufactured by punching work on the turret punch press or the like, and therefore, the load on the worker can be reduced in the installation work of the concave-convex part on the inner wall of the exhaust pipe 10.

The invention claimed is:

1. An exhaust assembly for a construction machine having a revolving upperstructure and an engine mounted on the revolving upperstructure, said exhaust assembly being arranged inside the revolving upperstructure of the construction machine, comprising:
   an after-treatment device for exhaust gas from the engine; and
   an exhaust pipe for releasing exhaust gas, which has been guided from an outlet port of the after-treatment device, to an outside of the exhaust pipe, wherein
   the exhaust pipe is arranged vertically on a body cover of the revolving upperstructure and includes a vertical portion that encloses a circumferential edge portion of the outlet port of the after-treatment device and a bent portion that bends from the vertical portion, and
   a concave-convex part, having plural concavities and convexities, extends in a direction of release of the exhaust gas and is arranged only on an inner wall of an upper part of the bent portion.

2. The exhaust assembly according to claim 1, wherein the concavities and convexities extend in a direction transverse to a direction of a flow of exhaust gas.

3. The exhaust assembly according to claim 2, wherein the concave-convex part has a mesh structure.

4. The exhaust assembly according to claim 3, wherein the mesh structure is a wire netting.

5. The exhaust assembly according to claim 1, wherein an air hole is defined between the exhaust pipe and the circumferential edge portion of the outlet port of the after-treatment device to allow ambient air to flow into the exhaust pipe through the air hole.

* * * * *